Patented Dec. 7, 1937

2,101,061

UNITED STATES PATENT OFFICE 2,101,061

CASTING

Wallace E. Gordon, Wilmington, Del., assignor, by mesne assignments, to E. I. du Pont de Nemours & Company, Wilmington, Del., a corporation of Delaware No Drawing. Application November 22, 1935, Serial No. 51,089

6 Claims. (Cl. 106—22)

This invention relates to a method of casting polymerizable organic liquids, to casting syrups and their preparation, and, more particularly, to the casting of polymerizable esters of methacrylic and acrylic acids wherein the induction period is shortened and controlled.

Heretofore, monomeric liquid acrylates and methacrylates have been cast, that is, disposed in a mold and subjected to conditions which cause polymerization of the monomer to a solid body of polymer. However, a serious objection to this casting procedure has been the highly variable and always prolonged period during which the monomer had to be subjected to polymerizing conditions such as elevated temperature, sunlight, etc., before polymerization apparently really began as indicated by an appreciable increase in the viscosity of the liquid. This period is known as the "induction period" and may be defined as the length of time elapsing from the moment the liquid monomer is subjected to polymerizing conditions until the liquid shows an appreciable increase in viscosity. The longer this induction period is, obviously the more uneconomical is the process. Likewise, great variations in the length of the induction period when using different batches of the same monomer, a regular occurrence, add enormously to the difficulty of working out an economical and efficient routine for casting on a commercial scale.

An object of the present invention is to provide methacrylic and acrylic acid ester casting syrups of short and relatively uniform induction periods. A further object is to provide a simple and economical method of preparing such syrups. A still further object is to provide a novel and economical method of casting methacrylic and acrylic acid esters.

The above objects are accomplished according to the present invention by dissolving a preformed polymeric mono-methacrylic acid ester or a polymeric mono-acrylic acid ester in a monomeric methacrylic or acrylic acid ester, to give a flowable syrup, disposing said syrup in a mold and then subjecting the syrup to polymerizing conditions until it is converted into a solid body.

By "poly-methacrylic acid ester" and "poly-acrylic acid ester" as used herein are meant polyhydric alcohol esters of methacrylic acid and acrylic acid in which more than one hydroxyl is esterified. Likewise, by "mono-methacrylic acid ester" and "mono-acrylic acid ester" as used herein are meant monohydric alcohol esters of methacrylic and acrylic acids.

As the preformed polymer will be dissolved in monomer prior to casting, it is not necessary to form same in a flawless mass and, consequently, accelerated methods of polymerization are permissible. The preformed polymer is then dissolved in the monomer preferably simply by stirring at approximately room temperature. Upon allowing the mixture to stand for some time, the monomer swells up the polymer and dissolves it. If desired, mechanical mixing may be resorted to, as by working the polymer in an internal type mixer, e. g., a "Banbury" mixer, and adding the monomer slowly thereto. In this manner, intimate mixing may be obtained in the matter of a few minutes. However, the particular method of forming the solution is not vital. After forming the solution, it may then be poured into molds according to the usual practice and subjected to polymerization conditions such as moderate heat, sunlight, or the like, to convert the syrup to a solid body.

In order to illustrate the invention, the following specific examples are given:

Example 1.—To 90 parts of methyl methacrylate monomer were added 10 parts of methyl methacrylate polymer, and the mixture stirred at room temperature until solution was complete. The syrup thus made, began to polymerize after heating for 0.2 hour at 80° C. ±1°.

The methyl methacrylate monomer under the same conditions required 2.2 hours before showing any evidences of beginning to polymerize.

Example 2.—To 95 parts of methyl methacrylate monomer from a different batch from that of Example 1 were added 5 parts of methyl methacrylate polymer, and the mixture stirred until solution was complete. The syrup thus made began to polymerize after heating at 80° C. ±1° for 1.1 hours.

The untreated methyl methacrylate monomer under the same conditions required 4.8 hours before showing any evidences of beginning to polymerize.

Example 3.—To 90 parts of methyl methacrylate monomer from a different batch from that of Examples 1 and 2 were added 10 parts of methyl methacrylate polymer, and the mixture stirred at substantially room temperature until solution was complete. The syrup thus made began to polymerize after 0.8 hour's heating at 80° C. ±1°.

The methyl methacrylate monomer alone under the same conditions required approximately 13.2 hours' heating at 80° C. ±1° before showing any evidences of beginning to polymerize.

Example 4.—To 90 parts of methyl methacrylate monomer from a different batch from that used in the preceding examples were added 10 parts of cyclohexyl methacrylate polymer, and the mixture stirred at substantially room temperature until solution was complete. The syrup thus prepared began to polymerize after 3.5 hours' heating at 80° C. ±1°.

The untreated methyl methacrylate monomer required 6.1 hours' heating under the same conditions before showing any evidences of beginning to polymerize.

Example 5.—To 90 parts of methyl methacrylate monomer from a different batch from that used in the preceding examples were added 10 parts of cyclohexyl methacrylate polymer, and the mixture stirred at substantially room temperature until solution was complete. The syrup thus made began to polymerize after heating at 80° C. ±1° for 3 hours.

The untreated methyl methacrylate monomer alone under the same conditions required 5.6 hours before showing any evidences of beginning to polymerize.

Example 6.—To 95 parts of isobutyl methacrylate monomer were added 5 parts of methyl methacrylate polymer, and the mixture stirred at substantially room temperature until solution was complete. The syrup thus made began to polymerize after heating for 0.8 hour at 80° C. ±1°.

The isobutyl methacrylate monomer alone under the same conditions required 5.3 hours before showing any evidences of beginning to polymerize.

The above examples show, in each instance, that, by dissolving a relatively small amount of preformed polymer in liquid monomer, a syrup is produced having an induction period materially less than that of monomer alone taken from the same batch. Examples 1, 2, and 3 also show that samples of monomer of the same ester taken from different batches have widely varying induction periods but that, by dissolving some preformed polymer of the same ester therein, the induction periods are made not only far shorter but much more uniform. That is, the untreated monomers showed a variation of 11 hours in their induction periods while the syrups containing preformed polymer showed a variation of less than 1 hour in their induction periods. Obviously, where different preformed polymers are used, or different monomers, the induction periods of the resulting syrups may not be as uniform but a substantial reduction in the induction period, as compared to the induction period of the straight monomer, invariably results.

It will be understood that the above examples are merely illustrative and that the present invention comprises broadly the preparation of a casting syrup of a preformed polymeric acrylate or methacrylate dissolved in a monomeric acrylate or methacrylate, the proportion of polymer being at least 1% by weight of the syrup, and the method of casting which comprises disposing the syrups of the present invention in a mold and then subjecting same to polymerizing conditions until conversion into a solid body due to polymerization results.

As the preformed polymer ingredient of the syrups of this invention, may be used any acrylic or methacrylic ester polymer or interpolymer which is soluble in the monomer. Among such esters may be mentioned such polymeric mono-methacrylic acid esters as the ethyl, propyl, amyl, isoamyl, octyl, decyl, dodecyl, octadecyl, methoxy-ethyl, ethoxy-ethyl, butoxy-ethyl, and butyl Carbitol methacrylates, as well as mixtures thereof, or interpolymers thereof with each other, or with vinyl esters, styrene, or the like. Likewise polymeric mono-acrylates may be used, such as the methyl, ethyl, propyl, butyl, amyl, isoamyl, decyl, dodecyl, octadecyl, cyclohexyl acrylates, as well as mixtures thereof, or interpolymers thereof, or interpolymers with vinyl esters, styrene and the like.

It will be noted that the polymeric ingredient of the syrups is, however, restricted to polymeric mono-methacrylates and mono-acrylates. The reason for this is that the poly-methacrylates and poly-acrylates are not soluble in monomer and hence cannot be used.

Instead of the monomeric ingredient of the syrups disclosed in the examples, there may be used any of the acrylates and methacrylates disclosed above, in their monomeric form, as well as such esters as diethylene glycol di-methacrylate, glycerol di-methacrylate, beta-diethylamino ethyl methacrylate, beta-di-N-butylamino-ethyl methacrylate, aminocyclohexyl methacrylate, triethanolamine mono-methacrylate, beta-piperidyl-N-ethyl methacrylate, beta-morpholine-N-ethyl-methacrylate, and the like, as well as the corresponding acrylic acid esters. The monomer ingredient of the syrups is not limited to mono-methacrylates and mono-acrylates, since the poly-methacrylic and poly-acrylic acid esters may be used in exactly the same manner as the mono-methacrylates and mono-acrylates.

The proportion of monomer ingredient to polymer ingredient in these syrups may be varied considerably but it is preferred that the polymer should amount to not less than about 1% of the syrup. As much polymer as desired may be used in the syrup although, as will be obvious to those skilled in the art, the proportion of polymer would never be so great as to give a composition that was not flowable, since otherwise disposition of the composition in molds would be difficult, if not impossible.

The particular manner of carrying out the casting is not of importance in the present invention. It is generally preferred to heat the monomer-polymer syrup at about 80° C., or lower, in a mold until it is converted to a solid polymer. However, the use of higher temperatures is not precluded and, if desired, transparent molds may be employed and the composition polymerized in the molds at ordinary temperatures by exposure to ultra violet light.

It is generally preferred to polymerize the syrup in the absence of a catalyst although the use thereof is not precluded since, in some cases, an advantage is obtained thereby through a reduction in the time required for completion of the polymerization. When catalysts are used, the proportion does not usually exceed 1%, based on the weight of the monomer, but larger amounts can be used under certain conditions. Among the polymerization agents which can be used may be mentioned benzoyl peroxide, barium peroxide, sodium peroxide, hydrogen peroxide, peracetic acid and other per acids, ozone, and ozonides.

The usual auxiliary agents normally used by those skilled in the art to modify the properties of the finished product may be incorporated with the syrups of the present invention. Plasticizers may be incorporated into either the monomer or polymer prior to admixture, or into the syrup, and suitable plasticizers include dibutyl phthalate, tricresyl phosphate, diethyl phthalate, phthalid, triacetin, dibutyl tartrate, and diethyl succinate. Pigments, fillers, dyes, cellulose derivatives, and natural and synthetic resins are other modifying agents frequently used.

When pigments or fillers are used, it is convenient to incorporate these into the syrup by grinding in a ball mill, or working in an internal type mixer such as a "Banbury" mixer. Alternatively, the pigment or filler can be dispersed in the monomer by grinding in a pebble mill, or the like, and then later adding the polymer. Also, the pigment or filler can be dispersed in a vegetable oil and the paste thus produced is added to the monomer or the syrup.

An outstanding advantage of the present invention is that it provides an easy and highly practical method of drastically cutting down the induction period of the ester to be polymerized and of making much more uniform the induction period of monomer from different batches. This eliminates the necessity of determining the casting cycle for each individual batch of monomer and decreases production costs by avoiding equipment tie-ups and by speeding up production. Further, by dissolving preformed polymer in monomer, the exact proportion of polymer in the syrup is known, whereas this is difficult to determine if straight monomer is partially polymerized in an attempt to accomplish the same result. By using different esters as the monomer and polymer ingredient of the syrups, the properties of the ultimate cast product can be varied to give the best results.

As many apparently widely different embodiments of this invention may be made without departing from the spirit and scope thereof, it is to be understood that the invention is not limited to the specific embodiments thereof except as defined in the appended claims.

I claim:
1. A flowable casting syrup comprising a preformed polymer from the group consisting of polymeric mono-methacrylic acid esters and polymeric mono-acrylic acid esters, dissolved in a monomer from the group consisting of monomeric methacrylic acid esters and monomeric acrylic acid esters, the proportion of polymer being at least 1% by weight of the syrup.
2. A flowable casting syrup comprising a preformed polymeric mono-methacrylic acid ester dissolved in a monomeric methacrylic acid ester, the proportion of polymer being at least 1% by weight of the syrup.
3. A flowable casting syrup comprising preformed polymeric methyl methacrylate dissolved in monomeric methyl methacrylate, the proportion of polymer being at least 1% by weight of the syrup.
4. A flowable casting syrup comprising preformed polymeric methyl methacrylate dissolved in monomeric methyl methacrylate, the proportion of polymer being 5-10% by weight of the syrup.
5. Method of preparing a flowable casting syrup comprising polymerizing a mono-methacrylic acid ester to form a solid polymer and dissolving said solid polymer in a liquid monomeric methacrylic acid ester in such proportion that a flowable syrup results containing at least 1% by weight of the syrup, of said polymer.
6. A flowable casting syrup comprising a preformed polymer from the group consisting of polymeric mono-methacrylic acid esters and polymeric mono-acrylic acid esters, dissolved in a monomer from the group consisting of monomeric methacrylic acid esters and monomeric acrylic acid esters, the proportion of polymer being 5-10% by weight of the syrup.

WALLACE E. GORDON.